No. 699,538. Patented May 6, 1902.
H. F. LARAVA.
BELT FASTENER FOR CONNECTING ENDS OF DRIVE BELTS.
(Application filed Sept. 3, 1901.)
(No Model.)
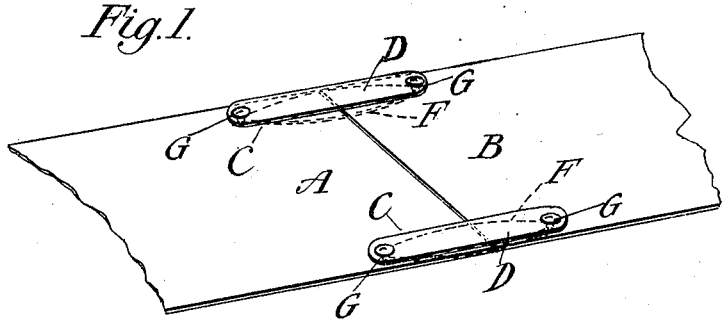
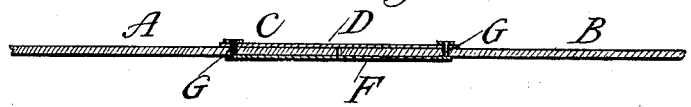
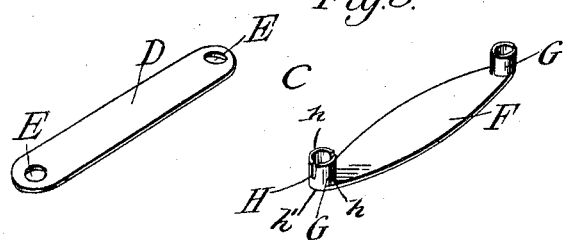
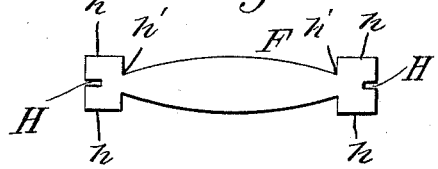
Henry F. Larava Inventor

UNITED STATES PATENT OFFICE.

HENRY F. LARAVA, OF WORCESTER, MASSACHUSETTS.

BELT-FASTENER FOR CONNECTING ENDS OF DRIVE-BELTS.

SPECIFICATION forming part of Letters Patent No. 699,538, dated May 6, 1902.

Application filed September 3, 1901. Serial No. 74,136. (No model.)

*To all whom it may concern:*

Be it known that I, HENRY F. LARAVA, a citizen of the United States, residing at Worcester, in the county of Worcester and State of Massachusetts, have invented certain new and useful Improvements in Belt-Fasteners for Connecting the Ends of Drive-Belts; and I do declare the following to be a full, clear, and exact description of the invention, such as will enable others skilled in the art to which it appertains to make and use the same.

The invention relates to belt-fasteners used in connecting the ends of drive-belts.

The object of the invention is to provide a belt-fastener which shall be simple of construction, durable in use, and comparatively inexpensive of production and which may be easily and quickly connected to the abutting ends of the belt.

With this and other objects in view the invention consists of certain novel features of construction, combination, and arrangement of parts, which will be hereinafter more fully described, and particularly pointed out in the appended claim.

In the accompanying drawings, Figure 1 is a perspective view of the meeting ends of a belt, showing them connected together by my improved fastener. Fig. 2 is a longitudinal vertical sectional view through the belt and fastener. Fig. 3 is a detail perspective view of the parts forming the fastener, and Fig. 4 is a plan view of the blank from which one part of the fastener is shaped.

Referring to the drawings, A and B denote the meeting ends of a belt, and C denotes the improved belt-fastener connecting the ends of the belt together. Each fastener is composed of a flat plate or strip D, made, preferably, of spring metal and provided at each end with an eye E and a plate F, preferably of spring metal, having at each end tubular rivets G, which project at an angle to the body of the plate and are adapted to be inserted through holes punched through the ends of the belt and through the holes in the plate D and then mashed or flattened. The tubular rivets are integral with the plate F and form extensions of the same and are made from a blank, as shown in Fig. 4, the extensions thereof being provided with slits H, and by bending the edges of the side portions *h* nearly together in tubular or circular shape and then bending the same at *h'* vertically upward the lower edges of the thus formed rivets will fold over and rest on the ends of the body portion of the plate F, as shown in Fig. 3, the slits and approximating edges of the side portions of the rivets rendering the same to be more readily spread apart by the insertion of a blunt tool in the hollow of the rivets. After being thus spread the ends are hammered flat, as shown in Fig. 2, thus securely connecting the ends of the belt together.

From the foregoing description, taken in connection with the accompanying drawings, the construction, mode of operation, and advantages of my invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

A belt-fastener for connecting the ends of drive-belts comprising a plate having slitted integral extended ends adapted to be bent to form tubular rivets on the upper terminal ends of said plate, the upward-extending ends when bent forming slits opposite the slits in the integral extended ends, and a plate with eyes coacting with said rivets, substantially as specified.

In testimony whereof I have hereunto set my hand in presence of two subscribing witnesses.

HENRY F. LARAVA.

Witnesses:
G. T. LINDFORS,
M. E. HOLDEN.